US008029004B2

(12) United States Patent
Lemieux

(10) Patent No.: US 8,029,004 B2
(45) Date of Patent: Oct. 4, 2011

(54) SNOWMOBILE SKI

(75) Inventor: Rene Lemieux, Granby (CA)

(73) Assignee: Bombardier Recreational Products Inc., Valcourt (CA)

( * ) Notice: Subject to any disclaimer, the term of this patent is extended or adjusted under 35 U.S.C. 154(b) by 617 days.

(21) Appl. No.: 12/146,515

(22) Filed: Jun. 26, 2008

(65) Prior Publication Data
US 2009/0322045 A1 Dec. 31, 2009

(51) Int. Cl.
B62B 13/00 (2006.01)
B62B 17/00 (2006.01)

(52) U.S. Cl. ............................................. 280/28; 180/182

(58) Field of Classification Search .................. 180/182, 180/183, 11.12, 609, 21.1, 22, 28
See application file for complete search history.

(56) References Cited

U.S. PATENT DOCUMENTS

| | | | |
|---|---|---|---|
| 3,860,078 A * | 1/1975 | Stoick | 180/183 |
| 4,390,151 A * | 6/1983 | Schneider | 244/108 |
| 4,699,229 A * | 10/1987 | Hirose et al. | 180/9.21 |
| 4,719,982 A * | 1/1988 | Shaver | 180/183 |
| 5,040,818 A * | 8/1991 | Metheny | 280/609 |
| 5,145,201 A * | 9/1992 | Metheny | 280/609 |
| 5,165,709 A * | 11/1992 | Jacques | 280/28 |
| 5,251,718 A * | 10/1993 | Inagawa et al. | 180/190 |
| 5,443,278 A * | 8/1995 | Berto | 280/28 |
| 6,102,413 A * | 8/2000 | Khennache et al. | 280/28 |
| 6,105,979 A * | 8/2000 | Desrochers | 280/28 |
| 6,199,648 B1 * | 3/2001 | Kanan | 180/182 |
| 6,308,966 B1 * | 10/2001 | Cook et al. | 280/28.11 |
| 6,331,008 B2 * | 12/2001 | Cormican | 280/22 |
| 6,378,889 B1 * | 4/2002 | Moriyama et al. | 280/609 |
| 6,431,561 B1 * | 8/2002 | Hedlund | 280/28 |
| 6,513,612 B2 * | 2/2003 | Moriyama et al. | 180/182 |
| D473,164 S * | 4/2003 | Mallette et al. | D12/7 |
| D473,489 S * | 4/2003 | Mallette et al. | D12/7 |
| 6,692,009 B2 * | 2/2004 | Lemieux | 280/28 |
| 6,705,620 B2 * | 3/2004 | Bruns | 280/28 |
| D514,980 S * | 2/2006 | Kukkonen | D12/7 |
| 7,017,695 B2 * | 3/2006 | Meunier et al. | 180/182 |
| 7,195,254 B2 * | 3/2007 | Makitalo | 280/28 |

(Continued)

OTHER PUBLICATIONS

619950096 Lynx Line-Up 2008 EN, Copyright 2007, cover page, p. 13 & 25, back cover page, Bombardier Recreational Products Inc.

(Continued)

Primary Examiner — Hau Phan
Assistant Examiner — Jacob Meyer
(74) Attorney, Agent, or Firm — Osler, Hoskin & Harcourt LLP

(57) ABSTRACT

A snowmobile ski has an upturned front portion, a middle portion, and a rear portion. A longitudinally extending rib protrudes from a top of the middle portion and is laterally spaced from a longitudinal centerline of the ski. An aperture is disposed in the longitudinally extending rib for permitting attachment of the ski to a snowmobile. A ramp extends from a first point to at least a second point. The first point is disposed longitudinally between the front portion and the aperture, and closer to the top of the middle portion than the aperture. The second point is disposed longitudinally between the first point and the rear portion, and further away from the top of the middle portion than a lower end of the aperture. The longitudinally extending rib is disposed between the longitudinal centerline and the ramp. A snowmobile having a pair of the above-described skis is also described.

21 Claims, 6 Drawing Sheets

U.S. PATENT DOCUMENTS

| | | | |
|---|---|---|---|
| 7,232,134 B2 * | 6/2007 | Ruzewski et al. | 280/28 |
| 7,243,927 B2 * | 7/2007 | Takahiko | 280/28 |
| 7,252,301 B2 * | 8/2007 | Valikangas | 280/609 |
| 7,287,763 B1 * | 10/2007 | Beaudoin | 280/28 |
| 7,389,995 B2 * | 6/2008 | Lemieux et al. | 280/28 |
| 7,404,565 B2 * | 7/2008 | Lachance | 280/28 |
| 7,413,198 B2 * | 8/2008 | Lemieux et al. | 280/28 |
| 7,427,074 B2 * | 9/2008 | Lemieux et al. | 280/28 |
| 7,614,627 B2 * | 11/2009 | Musselman | 280/28 |
| 7,789,400 B2 * | 9/2010 | Lachance | 280/28 |
| 2001/0013687 A1 * | 8/2001 | Cormican | 280/28 |
| 2001/0022435 A1 * | 9/2001 | Cormican | 280/28 |
| 2002/0036387 A1 * | 3/2002 | Lemieux | 280/28 |
| 2002/0041080 A1 * | 4/2002 | Moriyama et al. | 280/609 |
| 2002/0129983 A1 * | 9/2002 | Wubbolts et al. | 180/183 |
| 2003/0137117 A1 * | 7/2003 | Lund et al. | 280/28 |
| 2003/0151216 A1 * | 8/2003 | Takahiko | 280/28 |
| 2003/0160405 A1 * | 8/2003 | Bruns | 280/28 |
| 2003/0189302 A1 * | 10/2003 | Makitalo | 280/28 |
| 2004/0099458 A1 * | 5/2004 | Meunier et al. | 180/190 |
| 2005/0173873 A1 * | 8/2005 | Ruzewski et al. | 280/28 |
| 2005/0212231 A1 * | 9/2005 | Lachance | 280/28 |
| 2006/0061051 A1 * | 3/2006 | Lemieux | 280/28 |
| 2006/0061052 A1 * | 3/2006 | Lemieux | 280/28 |
| 2006/0076742 A1 * | 4/2006 | Scholl | 280/28 |
| 2006/0170195 A1 * | 8/2006 | Valikangas | 280/601 |
| 2007/0090614 A1 * | 4/2007 | Pryputniewicz | 280/28 |
| 2008/0303228 A1 * | 12/2008 | Wrightman | 280/28 |

OTHER PUBLICATIONS

Lynx Knock Out /05, Bombardier Recreational Products Inc.
07 Catalog Riding Gear, Parts and Accessories Fall Edition, Copyright 2006, cover page, table of contents, p. 79, Bombardier Recreational Products Inc., Canada.

* cited by examiner

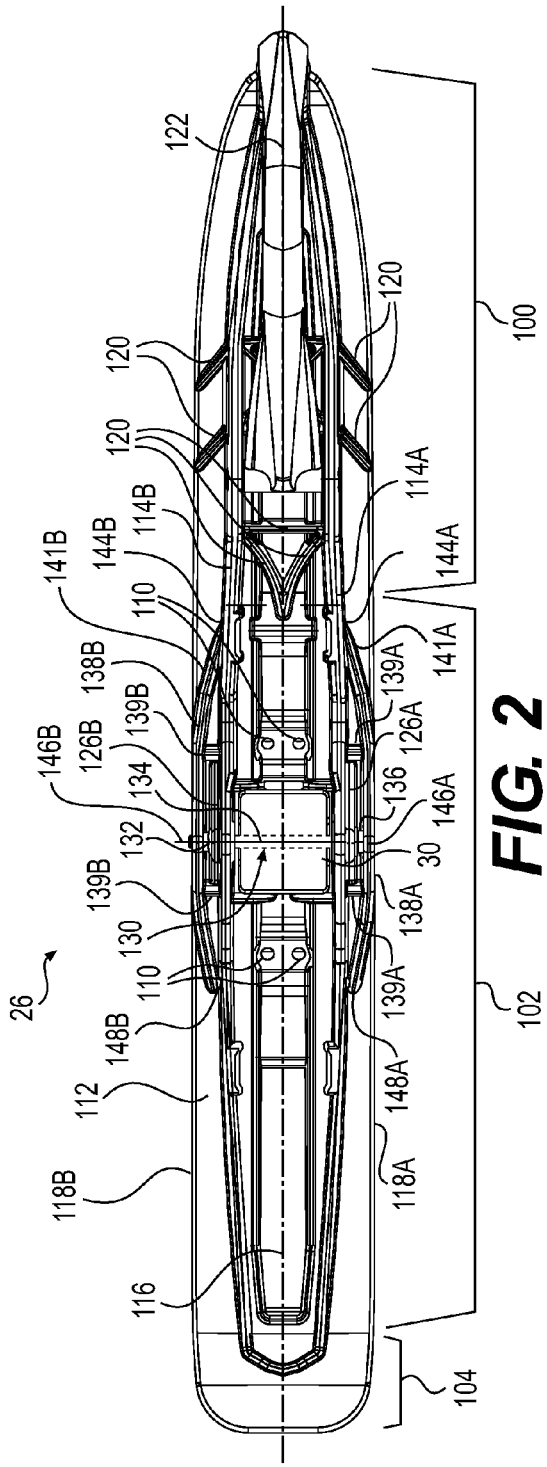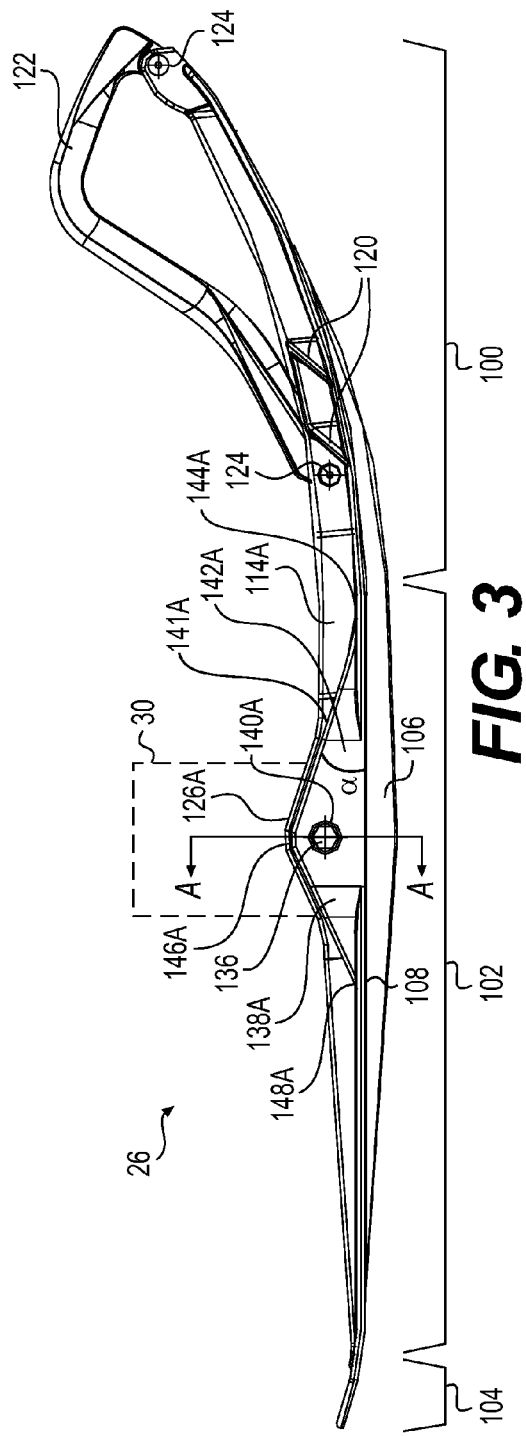

US 8,029,004 B2

SNOWMOBILE SKI

FIELD OF THE INVENTION

The present invention relates to skis for snowmobiles.

BACKGROUND OF THE INVENTION

As a snowmobile travels over snow, the upturned front ends of the skis encounter stationary air and forces the air up and around the front portion of the skis. For each ski, this creates a low pressure turbulent region behind the upturned front portion which causes air behind the upturned front portion to move toward the center of the ski until it makes contact with a vertical longitudinally extending rib typically found on snowmobile skis. Due to the forward motion of the vehicle, the air then travels along the rib toward the rear of the ski and is passed by the rest of the snowmobile at approximately the width of the footrests because the footrest are laterally aligned with the skis.

As seen in FIG. 6, when a snowmobile 200 travels over a relatively hard packed undersurface that is covered by a thin layer of light snow, the light snow is displaced by the front of the ski 202 and is picked up by the airflow (indicated by lines 204) around the ski 202 and is also eventually passed by the rest of the snowmobile 200.

Protective components of the snowmobile 200 such as a windshield 206, hand guards, and side panel wind deflectors 208 create a low pressure region (schematically illustrated as area 210) around the driver area when moving forward. This low pressure region pulls the turbulent air and the snow traveling with it (indicated by lines 212) toward the driver area. Once the snow contacts the driver's feet and lower legs and/or other vehicle components around the driver's area, it sticks to them and over time, the driver's lower legs are fully covered in snow which is, as would be understood, cold and unpleasant.

In some skis, a head of a fastener used to connect the ski to the snowmobile protrudes from the rib. The head of the fastener causes the air traveling along the rib to lose speed (relative to the snowmobile).

When the snow carried by the air flow makes contact with the head of the fastener and becomes entrained in the turbulent air behind the front portion of the ski, the overall height of the flow from the ground increases and further contributes to the negative pressure area sucking snow toward the vehicle driver area where it is finally deposited onto the foot boards and around the driver's feet and lower legs.

The turbulence caused by the head of the fastener could be minimized by providing a cap on the head or by recessing the head of the fastener in the rib. However, the turbulence caused by the upturned front portion of the ski would still cause snow to deposit onto the foot boards and around the driver's feet and lower legs.

Therefore, there is a need for a snowmobile ski which at least reduces the amount of snow onto the foot boards and around the driver's feet and lower legs due to the air turbulence caused by the ski.

SUMMARY OF THE INVENTION

It is an object of the present invention to ameliorate at least some of the inconveniences present in the prior art.

It is also an object of the present invention to provide a snowmobile ski having a ramp that deflects the air and snow flowing along a longitudinally extending rib of the ski upwardly.

It is another object of the present invention to provide a snowmobile with a pair of the above-mentioned skis.

By providing a ramp to deflect the air and snow flowing along the longitudinally extending rib upwardly, the velocity of the air and snow is modified such that it will not be directed towards the feet and lower legs and will not be pulled as much toward the driver due to the low pressure region created in the driver area.

In the case where the head of the fastener connecting the ski to the snowmobile protrudes from the longitudinally extending rib, providing the front end of the ramp forwardly of the head causes the air and snow to be deflected above the head of the fasteners. Therefore, the head of the fastener does not create additional turbulence.

In one aspect, the invention provides a snowmobile ski having an upturned front portion, a middle portion extending rearwardly from the front portion, and a rear portion extending rearwardly from the middle portion. The middle portion has a top, a bottom, and first and second outer edges. A longitudinally extending rib protrudes from the top of the middle portion. The longitudinally extending rib is laterally spaced from a longitudinal centerline of the ski. An aperture is disposed in the longitudinally extending rib for permitting attachment of the ski to a snowmobile. A ramp extends from a first point to at least a second point. The first point is disposed longitudinally between the front portion and the aperture. The first point is disposed closer to the top of the middle portion than the aperture. The second point is disposed longitudinally between the first point and the rear portion. The second point is disposed further away from the top of the middle portion than a lower end of the aperture. The longitudinally extending rib is disposed between the longitudinal centerline and the ramp.

In a further aspect, the longitudinally extending rib is laterally spaced from the first outer edge and is disposed between the longitudinal centerline of the ski and the first outer edge. The ramp is disposed between the longitudinally extending rib and the first outer edge.

In an additional aspect, the second point is generally aligned in a longitudinal direction of the ski with the aperture.

In a further aspect, the first point is disposed on the top of the middle portion.

In an additional aspect, the first point is disposed at an intersection of the top of the middle portion and the longitudinally extending rib.

In a further aspect, the first point is disposed closer to the longitudinally extending rib than the second point.

In an additional aspect, at least a portion of the ramp is laterally spaced from the longitudinally extending rib.

In a further aspect, the ramp extends from the second point to a third point disposed longitudinally between the aperture and the rear portion. The second point is disposed further away from the top of the middle portion than the third point.

In an additional aspect, an angle between the top of the middle portion and a line extending from the first point to the second point is between 10 and 40 degrees.

In a further aspect, the ramp has a side wall. A side wall aperture is disposed in the side wall. The side wall aperture is generally aligned in a longitudinal direction of the ski with the aperture disposed in the longitudinally extending rib.

In an additional aspect, the longitudinally extending rib is a first longitudinally extending rib, the aperture is a first aperture and the ramp is a first ramp. A second longitudinally extending rib protrudes from the top of the middle portion between the longitudinal centerline of the ski and the second outer edge. A second aperture is disposed in the second longitudinally extending rib for permitting attachment of the ski to a snowmobile. The second aperture is generally aligned in a longitudinal direction of the ski with the first aperture. A second ramp is disposed between the second longitudinally extending rib and the second outer edge. The second ramp extends from a first point to at least a second point. The first point is disposed longitudinally between the front portion and the second aperture. The first point is disposed closer to the top of the middle portion than the second aperture. The second point is disposed longitudinally between the first point and the rear portion. The second point is disposed further away from the top of the middle portion than a lower end of the second aperture.

In a further aspect, at least one structural rib extends between the longitudinally extending rib and the portion of the ramp that is laterally spaced from the longitudinally extending rib.

In another aspect, the invention provides a snowmobile having a frame including an engine compartment and a tunnel rearward of the engine compartment, an engine disposed in the engine compartment, an endless drive track disposed below the tunnel and being operatively connected to the engine for propelling the snowmobile, a left ski leg operatively connected to the frame, a left ski connected to the left ski leg by a first fastener, a right ski leg operatively connected to the frame, a right ski connected to the right ski leg by a second fastener, and a steering assembly operatively connected to the left and right ski legs for steering the left and right skis. Each of the left and right skis has an upturned front portion, a middle portion extending rearwardly from the front portion and a rear portion extending rearwardly from the middle portion. The middle portion has a top, a bottom, and first and second outer edges. A longitudinally extending rib protrudes from the top of the middle portion. The longitudinally extending rib is laterally spaced from a longitudinal centerline of the ski. An aperture is disposed in the longitudinally extending rib. The aperture receives a corresponding one of the first and second fasteners for permitting attachment of the ski to a corresponding one of the left and right ski legs. A ramp extends from a first point to at least a second point. The first point is disposed longitudinally between the front portion and the aperture. The first point is disposed closer to the top of the middle portion than the aperture. The second point is disposed longitudinally between the first point and the rear portion. The second point is disposed further away from the top of the middle portion than a lower end of the aperture. The longitudinally extending rib is disposed between the longitudinal centerline and the ramp.

In an additional aspect, for each of the left and right skis: the longitudinally extending rib is laterally spaced from the first outer edge and is disposed between the longitudinal centerline of the ski and the first outer edge, and the ramp is disposed between the longitudinally extending rib and the first outer edge.

In a further aspect, a head of the first fastener protrudes from the longitudinally extending rib of the left ski and is disposed laterally between the longitudinally extending rib and the ramp of the left ski. A head of the second fastener protrudes from the longitudinally extending rib of the right ski and is disposed laterally between the longitudinally extending rib and the ramp of the right ski.

In an additional aspect, for each of the left and right skis: the ramp has a side wall, a side wall aperture is disposed in the side wall, and the side wall aperture is generally aligned in a longitudinal direction of the ski with the head of a corresponding one of the first and second fasteners.

In a further aspect, for each of the left and right skis, the second point is generally aligned in a longitudinal direction of the ski with the aperture.

In an additional aspect, for each of the left and right skis, the first point is disposed on the top of the middle portion.

In a further aspect, for each of the left and right skis, the first point is disposed laterally inwardly of an outer end of a head of a corresponding one of the first and second fasteners.

In an additional aspect, for each of the left and right skis, the first point is disposed closer to the longitudinally extending rib than the second point.

In a further aspect, for each of the left and right skis, at least a portion of the ramp is laterally spaced from the longitudinally extending rib.

In an additional aspect, for each of the left and right skis, an angle between the top of the middle portion and a line extending from the first point to the second point is between 10 and 40 degrees.

For purposes of this application, the terms related to spatial orientation such as forwardly, rearwardly, left, and right should be understood as they would normally be understood by a driver of the snowmobile sitting thereon in a normal driving position. It should be understood that terms related to spatial orientation when referring to the snowmobile ski alone should be understood as they would normally be understood when the ski is installed on a snowmobile.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 2 is a top plan view of a ski, ski leg, and handle assembly of the snowmobile of FIG. 1;

FIG. 3 is a side view of the assembly of FIG. 3;

DETAILED DESCRIPTION OF THE PREFERRED EMBODIMENTS

Figure 1:
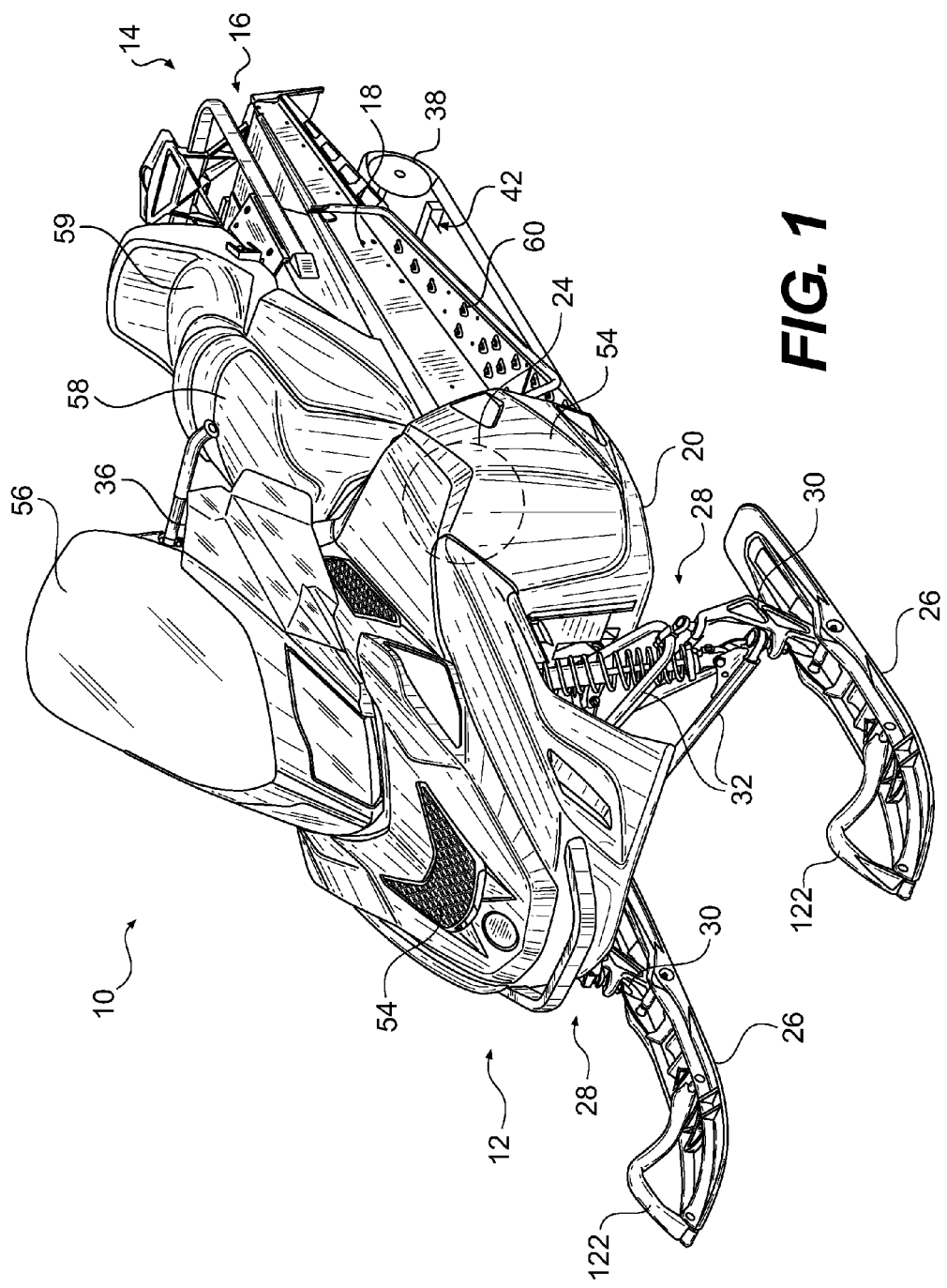
FIG. 1 is a perspective view, taken from a front, left side, of a snowmobile.
Figure 4:
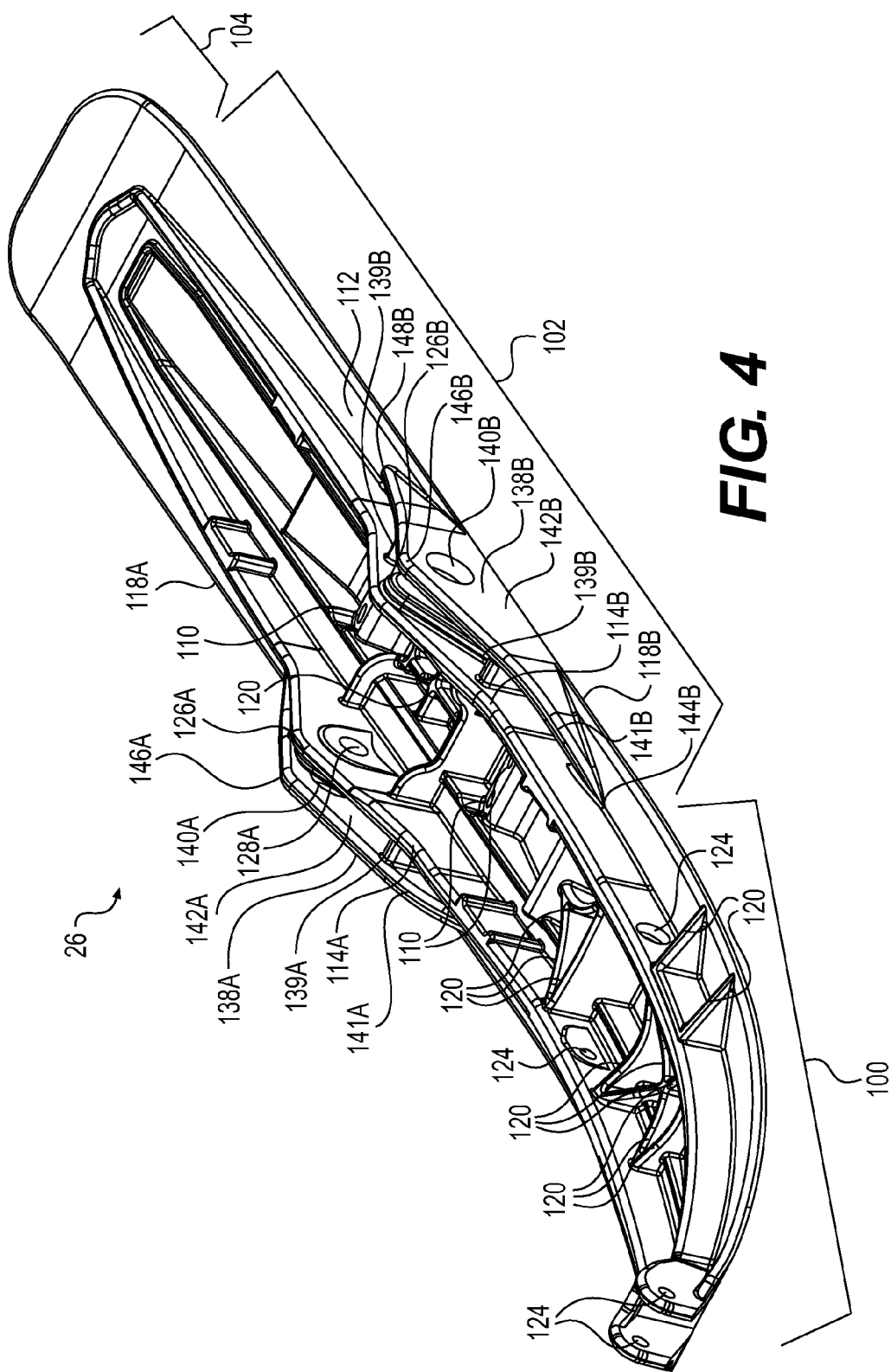
FIG. 4 is a perspective view, taken from a front, left side, of the ski of FIG. 2.

A snowmobile 10, according to the present invention, includes a forward portion 12 and a rearward portion 14 which are defined consistently with a forward travel direction of the vehicle. The snowmobile 10 includes a frame (also known as a chassis) 16 which includes a rear tunnel 18, an engine cradle 20. An engine 24, which is schematically illustrated in FIG. 1, is carried by the engine cradle portion 20 of the frame 16 which forms part of an engine compartment. Two skis 26 are positioned at the forward portion 12 of the snowmobile 10 and are attached to the frame 16 through a front suspension assembly 28. Each front suspension assembly 28 includes a ski leg 30, supporting arms 32 and ball joints (not shown) for operatively joining its ski leg 30 and supporting arms 32. Each ski leg 30 is operatively connected to a steering assembly which includes a steering column (not shown) connected to a handlebar 36. The handlebar 36 is used to rotate the ski legs 30 and thus the skis 26 in order to steer the vehicle.

An endless drive track 38 is positioned at the rear portion 14 of the snowmobile 10 under the tunnel 18. The endless drive track 38 is operatively connected to the engine 24 through a belt transmission system (not shown). The endless drive track 38 is driven to run about a rear suspension assembly 42 for propelling of the snowmobile 10.

At the front portion 12 of the snowmobile 10, fairings 54 enclose the engine 24 and the belt transmission system, thereby providing an external shell that not only protects the engine 24 and the belt transmission system, but can also be decorated to make the snowmobile 10 more aesthetically pleasing. Typically, the fairings 54 include a hood and one or more side panels that can be opened to allow access to the engine 24 and the belt transmission system when this is required, for inspection or maintenance of the engine 24 and/or the belt transmission system, for example. In the snowmobile 10 shown in FIG. 1, the side panels can be opened along a vertical axis to swing away from the snowmobile 10. A windshield 56 is connected to the fairings 54 near the front portion 12 of the snowmobile 10. Alternatively, the windshield 56 could be connected directly to the handlebar 36. The windshield 56 acts as a wind screen to lessen the force of the air on the rider while the snowmobile 10 is moving.

A straddle seat 58 is positioned atop the frame 16 and extends from the rear portion 14 of the snowmobile 10 to the fairings 54. A rear portion of the seat 58 provides a passenger seat 59. Two footrests 60 are positioned on opposite sides of the snowmobile 10 below the seat 58 to accommodate the driver's and passenger's feet.

Additional aspects and features of a snowmobile similar to the snowmobile 10 described above may be found in United States Patent Publication No. 2007/0257453 A1, published Nov. 8, 2007, the entirety of which is incorporated herein by reference.

It should be noted that the above is only an exemplary description of a snowmobile. Those of ordinary skill in the art would recognize that there are other known ways of designing a snowmobile and that the present invention would encompass these other known ways.

Turning now to FIGS. 2 to 5, one of the skis 26 of the snowmobile 10 will be described. It should be understood that both skis 26 are identical and, as such, the following description applies to both skis. By having two identical skis 26, the manufacturing of the snowmobile 10 is simplified. It is contemplated however that the skis 26 could be different. For example, the left and right skis 26 could be mirror images of each other.

The ski 26 has an upturned front portion 100, a middle portion 102, and an upturned rear portion 104. The front portion 100 has a length corresponding to 30 to 50 percent of an overall length of the ski 26. The middle portion 102 has a length corresponding to 45 to 65 percent of the overall length of the ski 26. The rear portion 104 preferably has a length corresponding to 2 to 15 percent of the overall length of the ski 26. It is contemplated that other relative lengths of the front portion 100, the middle 102, and rear portion 104 could be used. The middle portion 102 has a generally flat bottom 108 in the longitudinal direction of the ski 26. A keel 106 is connected to the bottom 108 of the ski. A pair of skags (not shown) are preferably connected to the undersurface of the keel 106. The skags are connected to the ski 26 via openings 110 provided in a top 112 of the middle portion 102. It is contemplated that only one skag could be connected to each ski 26. Additional information regarding the attachment of skags to a ski may be found in United States Patent Publication No. 2007/0257453 A1.

The ski 26 has a pair of longitudinally extending ribs 114A, 114B protruding from the top of the ski 26 to provide structural reinforcement to the ski 26. Each rib 114A, 114B is disposed between a longitudinal centerline 116 (FIG. 2) of the ski 26 and a corresponding outer edge 118A, 118B of the middle portion 102. The ribs 114A, 114B are preferably spaced from the longitudinal centerline 116 and their corresponding outer edge 118A, 118B. Each rib 114A, 114B extends from the front portion 100 to the rear portion 104 in a longitudinal direction. It is contemplated that the ribs 114A, 114B could only extend over the middle portion 102, in which case additional ribs would be provided over at least the front portion 100. Additional reinforcement ribs 120 (only some of which are labelled for clarity) are provided on the top of the ski 26 to provide further structural reinforcement.

A handle 122 (FIGS. 1 to 3) is connected to the front portion 100 of the ski 26 via fasteners (not shown) inserted in apertures 124 in the ribs 114A, 114B. The handle 122 allows the skis 26, and therefore the forward portion 12 of the snowmobile 10, to be lifted.

Figure 5:
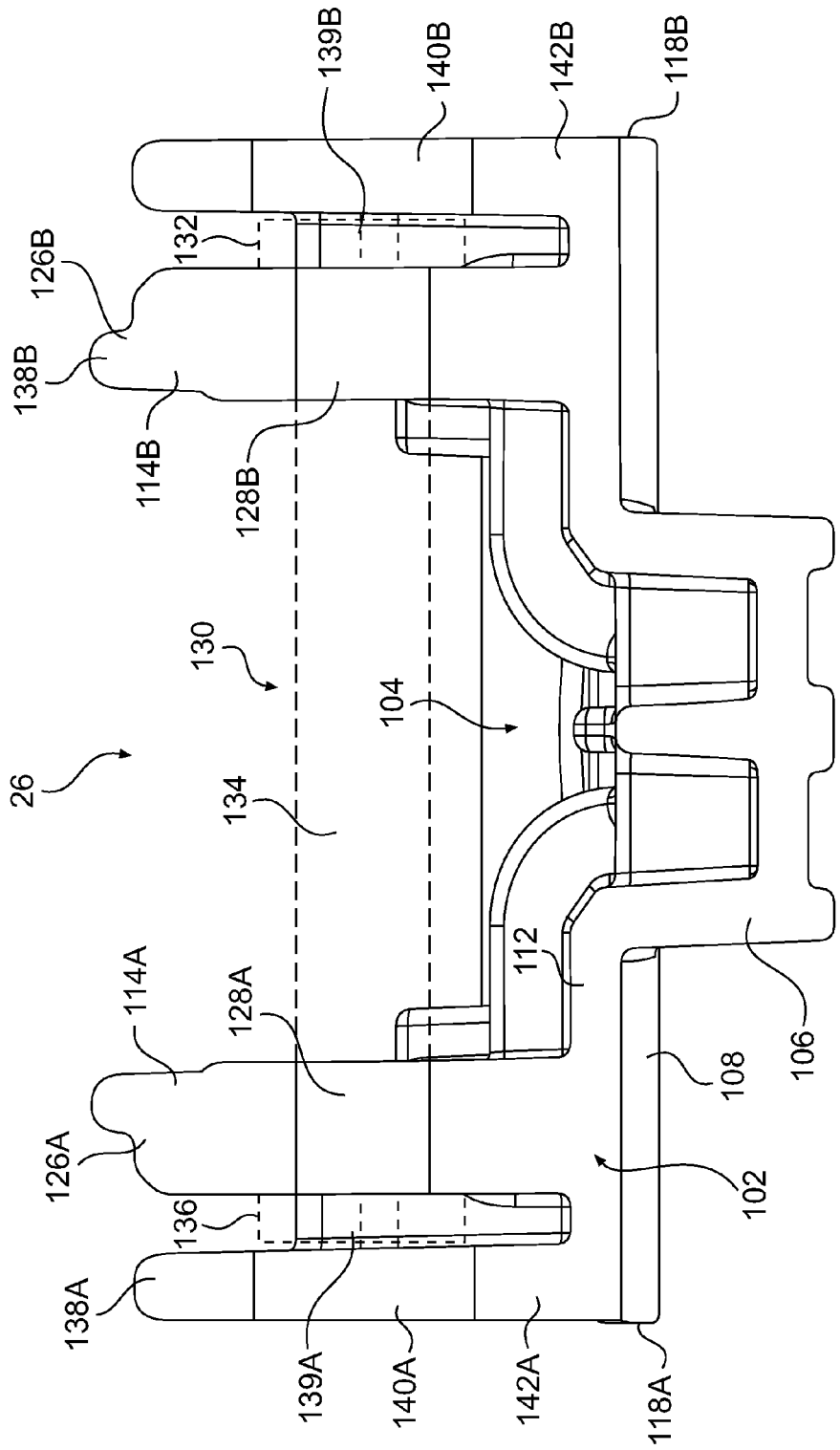
FIG. 5 a cross-sectional view of the ski of FIG. 3, taken through line A-A of FIG. 3.

Raised portions 126A, 126B of the ribs 114A, 114B are located in the middle portion 102, near the longitudinal center of the ski 26. The raised portions 126A, 126B are provided with apertures 128A, 128B (FIGS. 4 and 5) to fasten the ski 26 to its corresponding ski leg 30 (shown schematically in phantom in FIGS. 2 and 3). The apertures 128A, 128B are located at a distance from the front end of the ski 26 corresponding to a percentage of between 50 to 70 of the overall length of the ski 26, although other locations are contemplated. A fastener 130 (shown in phantom in FIGS. 2 and 5) is inserted through the apertures 128A, 128B and corresponding apertures (not shown) in the ski leg 30. In the present embodiment, the fastener 130 is a nut 132 and bolt 134 fastener, however other types of fasteners are contemplated. As best seen in FIG. 5, one end of the bolt 134 has a bolt head 136 abutting against the rib 114A. The other end of the bolt 134 protrudes from the rib 114B and the nut 132 is threaded onto this end to abut against the rib 114B. It should be understood that the bolt 134 could be inserted such that the bolt head 136 abuts against the rib 114B and the nut 132 abuts against the rib 114A. A thickness of the raised portions 126A, 126B of the ribs 114A, 114B is greater than a thickness of a remainder of the ribs 114A, 114B in order to provide the additional strength necessary to resist the forces and stresses applied by the fastener 130 to the ribs 114A, 114B.

The ski 26 is also provided with ramps 138A, 138B. Each ramp 138A, 138B is disposed between its corresponding rib 114A, 114B and its corresponding outer edge 118A, 118B. It is contemplated that the ribs 114A, 114B could be located near or at their corresponding outer edges 118A, 118B, in which case the ramps 138A, 138B may extend in part or completely beyond their corresponding outer edges 118A, 118B. Since the ski 26 is symmetric about its longitudinal centerline 116, only ramp 138A will be described, and ramp 138B should be understood to be a mirror image thereof Features corresponding to the ramp 138B will be labelled with the same reference numeral as those used for the ramp 138A, but with the suffix B. The positioning of ramp 138A when applied to ramp 138B should be understood with respect to features of the ski 26 being labelled with the suffix B. For example, the ramp 138A is disposed between the rib 114A and the outer edge 118A of the middle portion 102. Therefore, when applying this description to ramp 138B, it should be understood that the ramp 138B is disposed between the rib 114B and the outer edge 118B of the middle portion 102. It is contemplated that the ramps 138A, 138B may not be mirror images of each other, such that the shape of each ramp 138A, 138B may be optimised for the in-use air flow and pressure characteristics existing on its side of the ski 26. It is also contemplated that each ski 26 could be provided with only a single ramp 138. In cases where each ski 26 is provided with only a single ramp 138, the ramp 138 is preferably provided on the outer side of the ski 26 when installed on the snowmobile 10 (i.e. on the left side of the left ski 26 and on the right side of the right ski 26).

As can be seen, a portion of the ramp 138A is spaced from the rib 114A such that the bolt head 136 is disposed between the ramp 138A and the rib 114A (see FIG. 5). Structural ribs 139A are provided on either side of the aperture 128A between the ramp 138A and the rib 114A. The ramp 138A has an upper edge 141A and a side wall 142A. An aperture 140A is provided in the side wall 142A of the ramp 138 such that the aperture 140A is aligned with the aperture 128A (and therefore bolt head 136). This allows for easy installation and removal of the fastener 130. It is contemplated that the ramp 138A could completely fill the gap between the side wall 142A and the rib 114A, in which case the bolt head 136 would be located inside the aperture 140A.

A front end 144A of the ramp 138A is disposed on the top 112 of the middle portion 102, at the intersection of the rib 114A and the top 112, so as to be disposed laterally inwardly of the outer end of the bolt head 136. It is contemplated that the front end 144A of the ramp 138A could be spaced from one or both of the top of the middle portion 102 and the rib 114A, however the front end 144A is preferably closer to the top 112 of the middle portion 102 than the aperture 128A. The front end 144A of the ramp 138A is positioned forwardly of the aperture 128A but rearwardly of the upturned front portion 100 of the ski 26. The front end 144A of the ramp 138A is located at a distance from the front end of the ski 26 corresponding to a percentage of between 35 to 65 percent of the overall length of the ski 26, although other locations are contemplated.

From its front end 144A, the ramp 138A extends rearwardly and upwardly to an apex 146A and then rearwardly and downwardly from the apex 146A to a rear end 148A of the ramp 138A. The rear end 148A of the ramp 138A is disposed on the top 112 of the middle portion 102 forwardly of the rear portion 104 of the ski 26. As can be seen in FIG. 2, from its front end 144A, the ramp 138A extends laterally away from the rib 114A up to the apex 146A, and from the apex 146A, the ramp 138A extends laterally back towards the rib 114A, such that the side wall 142A is generally curved as viewed in FIG. 2. It is contemplated that the ramp 138A could only extend from the front end 144A to the apex 146A (i.e. the apex 146A would be the rearmost portion of the ramp 138A). It is also contemplated that the ramp 138A could be parallel to and spaced from the rib 114A. It is also contemplated that the ramp 138A could be straight (as view in FIG. 2) and extend laterally away from the rib 114A from its front end 144A to its apex 146A.

As can be seen, the apex 146A is generally aligned in a longitudinal direction of the ski 26 with the aperture 128A and is disposed vertically above the aperture 128A. It is contemplated that the apex 146A of the ramp 138A could be disposed forwardly of the aperture 128 (but rearwardly of the front end 144A) and closer to the top 112 of the middle portion 102, however the apex 146A is preferably further from the top 112 of the middle portion 102 than the lower end of the aperture 128A. An angle α (FIG. 3) between a line extending from the front end 144A to the apex 146A and the top 112 of the middle portion 102 is preferably between 10 and 40 degrees.

Figure 6:
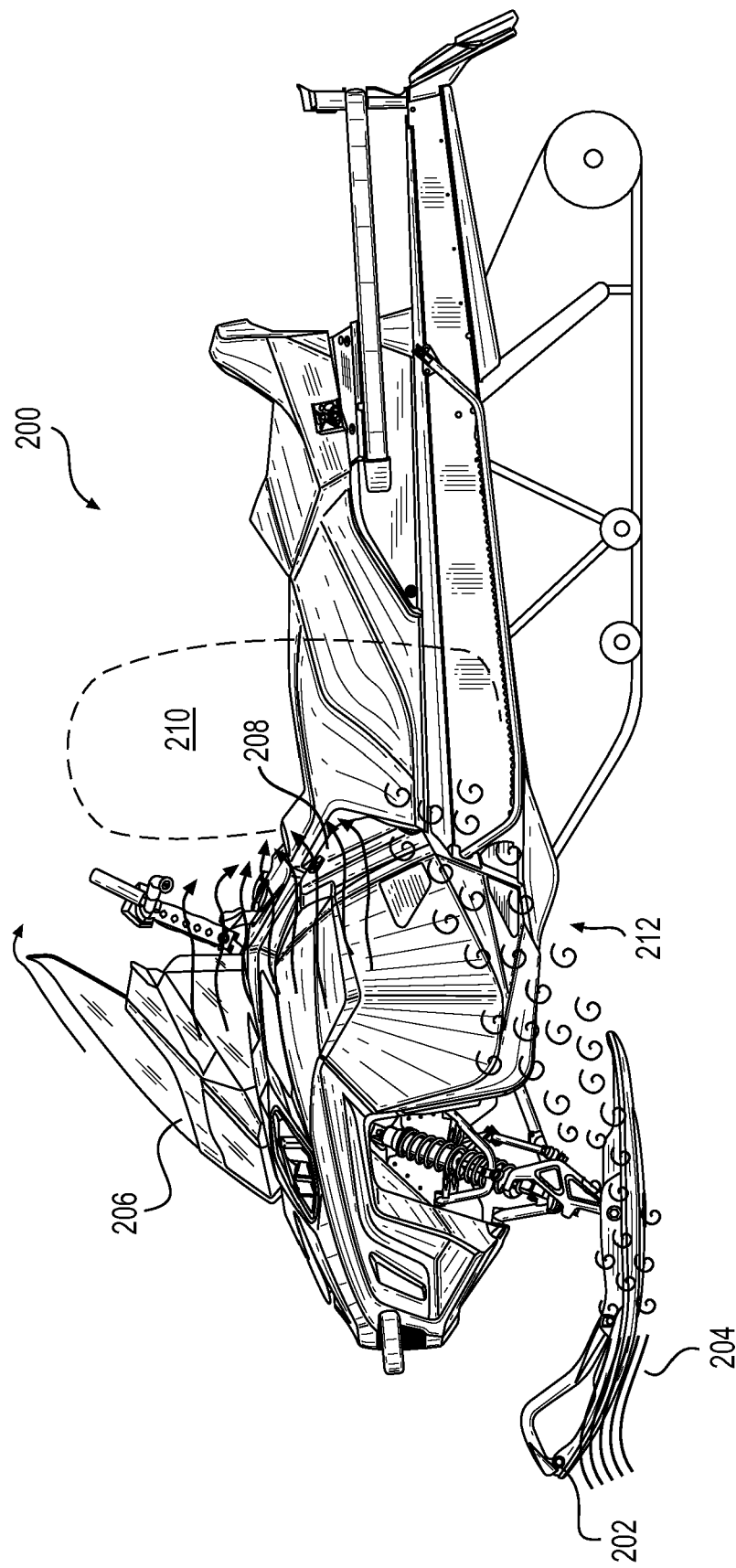
FIG. 6 is a side view of a snowmobile having a prior art ski schematically illustrating a flow of air and snow around the ski and snowmobile when the snowmobile is moving forward.
Figure 7:
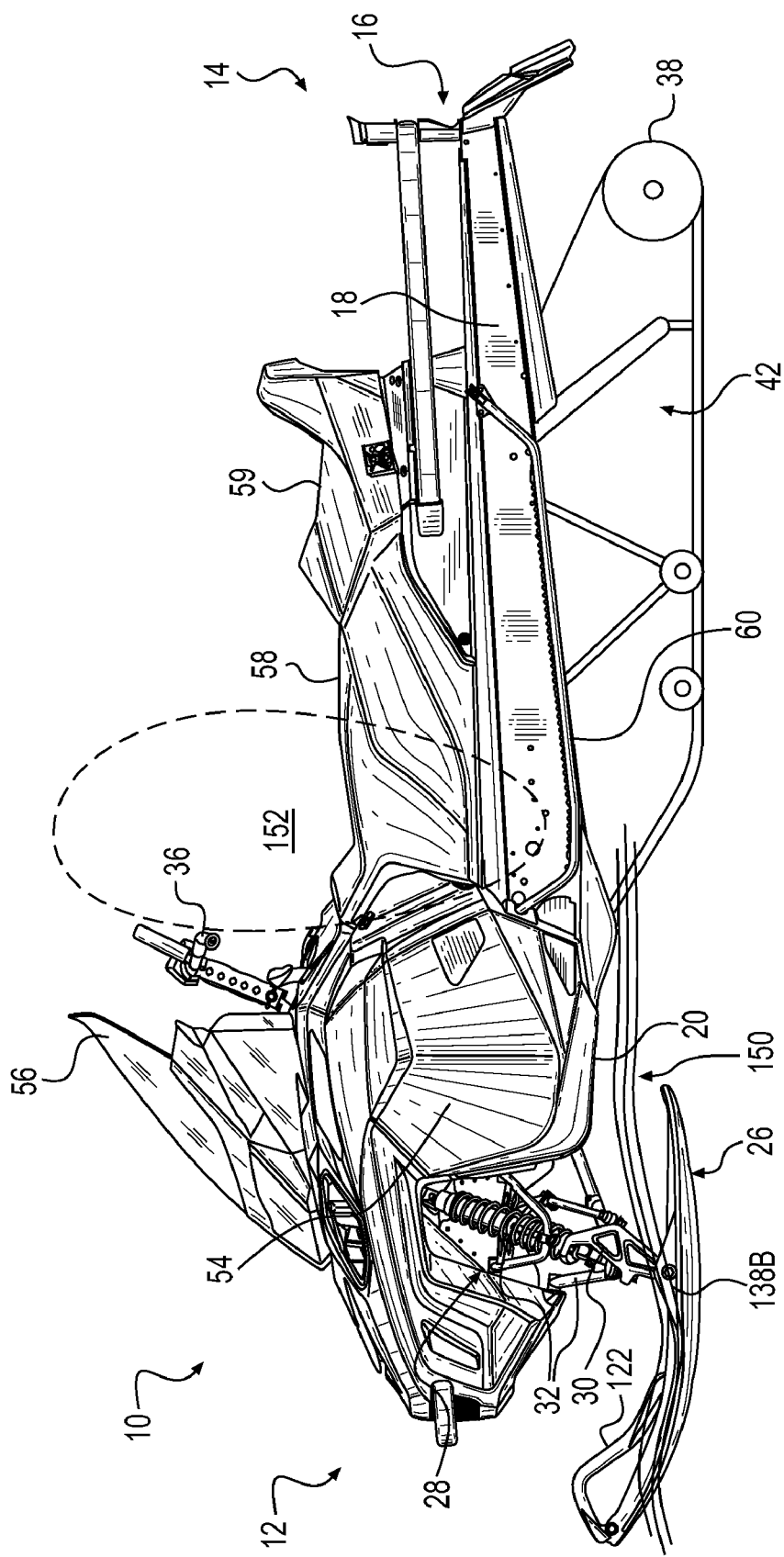
FIG. 7 is a side view of the snowmobile of FIG. 1 illustrating a flow of air and snow around the ski and snowmobile when the snowmobile is moving forward.

As can be seen in FIG. 7, by providing and locating ramps 138A, 138B, and more specifically the portions of the ramps 138A, 138B extending from the front ends 144A, 114B to the apexes 146A, 146B, as described above, during operation of the snowmobile 10, the ramps 138A, 138B can deflect the air and snow flowing along the longitudinally extending ribs 114A, 114B upwardly (as indicated by lines 150), and therefore change the velocity of the air and snow such that it will not be pulled towards the feet and lower legs of the driver of the snowmobile 10 by the low pressure region 152 created in the driver area. As can be understood by comparing FIG. 7 to FIG. 6, this results in a lot less snow being deposited on the feet and lower legs of the driver of the snowmobile 10 than with prior art skis.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:
1. A snowmobile ski comprising:
an upturned front portion;
a middle portion extending rearwardly from the front portion, the middle portion having a top, a bottom, and first and second outer edges;
a rear portion extending rearwardly from the middle portion;
a longitudinally extending rib protruding from the top of the middle portion, the longitudinally extending rib being laterally spaced from a longitudinal centerline of the ski;
an aperture disposed in the longitudinally extending rib for permitting attachment of the ski to a snowmobile; and
a ramp extending from a first point to at least a second point, the first point being disposed longitudinally between the front portion and the aperture, the first point being disposed closer to the top of the middle portion than the aperture, the second point being disposed longitudinally between the first point and the rear portion, the second point being disposed further away from the top of the middle portion than a lower end of the aperture, the longitudinally extending rib being disposed laterally between the longitudinal centerline and the second point,
the ramp having an upper edge sloping from the first point to the second point, wherein the first point is disposed at an intersection of the top of the middle portion and the longitudinally extending rib.

2. The ski of claim 1, wherein the longitudinally extending rib is laterally spaced from the first outer edge and is disposed between the longitudinal centerline of the ski and the first outer edge; and
    wherein the ramp is disposed between the longitudinally extending rib and the first outer edge.

3. The ski of claim 1, wherein the second point is generally aligned in a longitudinal direction of the ski with the aperture.

4. The ski of claim 1, wherein the first point is disposed closer to the longitudinally extending rib than the second point.

5. The ski of claim 1, wherein at least a portion of the ramp is laterally spaced from the longitudinally extending rib.

6. The ski of claim 1, wherein the ramp extends from the second point to a third point disposed longitudinally between the aperture and the rear portion; and
    wherein the second point is disposed further away from the top of the middle portion than the third point.

7. The ski of claim 6, wherein the ramp is generally triangular in shape and the second point is an apex of the ramp.

8. The ski of claim 1, wherein an angle between the top of the middle portion and a line extending from the first point to the second point is between 10 and 40 degrees.

9. The ski of claim 1, wherein:
the ramp has a side wall,
a side wall aperture is disposed in the side wall, and
the side wall aperture is generally aligned in a longitudinal direction of the ski with the aperture disposed in the longitudinally extending rib.

10. The ski of claim 2, wherein the longitudinally extending rib is a first longitudinally extending rib, the aperture is a first aperture and the ramp is a first ramp,
the ski further comprising:
    a second longitudinally extending rib protruding from the top of the middle portion between the longitudinal centerline of the ski and the second outer edge;
    a second aperture disposed in the second longitudinally extending rib for permitting attachment of the ski to a snowmobile, the second aperture being generally aligned in a longitudinal direction of the ski with the first aperture; and
    a second ramp disposed between the second longitudinally extending rib and the second outer edge, the second ramp extending from a first point to at least a second point, the first point being disposed longitudinally between the front portion and the second aperture, the first point being disposed closer to the top of the middle portion than the second aperture, the second point being disposed longitudinally between the first point and the rear portion, the second point being disposed further away from the top of the middle portion than a lower end of the second aperture.

11. The ski of claim 5, further comprising at least one structural rib extending between the longitudinally extending rib and the portion of the ramp.

12. A snowmobile comprising:
a frame, the frame including:
    an engine compartment; and
    a tunnel rearward of the engine compartment;
an engine disposed in the engine compartment;
an endless drive track disposed below the tunnel and being operatively connected to the engine for propelling the snowmobile;
a left ski leg operatively connected to the frame;
a left ski connected to the left ski leg by a first fastener;
a right ski leg operatively connected to the frame;
a right ski connected to the right ski leg by a second fastener; and
a steering assembly operatively connected to the left and right ski legs for steering the left and right skis,
each of the left and right skis including:
    an upturned front portion;
    a middle portion extending rearwardly from the front portion, the middle portion having a top, a bottom, and first and second outer edges;
    a rear portion extending rearwardly from the middle portion;
    a longitudinally extending rib protruding from the top of the middle portion, the longitudinally extending rib being laterally spaced from a longitudinal centerline of the ski;
    an aperture disposed in the longitudinally extending rib, the aperture receiving a corresponding one of the first and second fasteners for permitting attachment of the ski to a corresponding one of the left and right ski legs; and
    a ramp extending from a first point to at least a second point, the first point being disposed longitudinally between the front portion and the aperture, the first point being disposed closer to the top of the middle portion than the aperture, the second point being disposed longitudinally between the first point and the rear portion, the second point being disposed further away from the top of the middle portion than a lower end of the aperture, the longitudinally extending rib being disposed laterally between the longitudinal centerline and the second point,
the ramp having an upper edge sloping from the first point to the second point, wherein the first point is disposed at an intersection of the top of the middle portion and the longitudinally extending rib.

13. The ski of claim 12, wherein, for each of the left and right skis:
the longitudinally extending rib is laterally spaced from the first outer edge and is disposed between the longitudinal centerline of the ski and the first outer edge; and
the ramp is disposed between the longitudinally extending rib and the first outer edge.

14. The snowmobile of claim 12, wherein a head of the first fastener protrudes from the longitudinally extending rib of the left ski and is disposed laterally between the longitudinally extending rib and the ramp of the left ski; and
wherein a head of the second fastener protrudes from the longitudinally extending rib of the right ski and is disposed laterally between the longitudinally extending rib and the ramp of the right ski.

15. The snowmobile of claim 14, wherein, for each of the left and right skis:
the ramp has a side wall,
a side wall aperture is disposed in the side wall, and
the side wall aperture is generally aligned in a longitudinal direction of the ski with the head of a corresponding one of the first and second fasteners.

16. The snowmobile of claim 12, wherein, for each of the left and right skis, the second point is generally aligned in a longitudinal direction of the ski with the aperture.

17. The snowmobile of claim 12, wherein, for each of the left and right skis, the first point is disposed laterally inwardly of an outer end of a head of a corresponding one of the first and second fasteners.

18. The snowmobile of claim 12, wherein, for each of the left and right skis, the first point is disposed closer to the longitudinally extending rib than the second point.

19. The snowmobile of claim 12, wherein, for each of the left and right skis, at least a portion of the ramp is laterally spaced from the longitudinally extending rib.

20. The snowmobile of claim 12, wherein, for each of the left and right skis, an angle between the top of the middle portion and a line extending from the first point to the second point is between 10 and 40 degrees.

21. The snowmobile of claim 12, wherein, for each of the left and right skis, the ramp is generally triangular in shape and the second point is an apex of the ramp.

* * * * *